United States Patent [19]

Slattery et al.

[11] Patent Number: 5,637,268
[45] Date of Patent: Jun. 10, 1997

[54] METHOD OF EXTRUDING PLASTICS

[75] Inventors: John C. Slattery, College Station, Tex.; A. J. Giacomin, Antibes, France

[73] Assignee: Texas A & M University System, College Station, Tex.

[21] Appl. No.: 238,953

[22] Filed: May 6, 1994

[51] Int. Cl.$^6$ ..................................... B29C 47/76
[52] U.S. Cl. .................. 264/102; 264/176.1; 264/349
[58] Field of Search .............................. 264/101, 102, 264/349, 176.1; 425/203, 467

[56] References Cited

U.S. PATENT DOCUMENTS

| | | | |
|---|---|---|---|
| 2,991,508 | 7/1961 | Fields et al. | |
| 3,036,335 | 5/1962 | Heston et al. | 264/102 |
| 3,082,816 | 3/1963 | Skidmore | 264/101 |
| 3,235,640 | 2/1966 | Carton et al. | 264/101 |
| 3,410,938 | 11/1968 | Schippers | 264/102 |
| 3,508,683 | 4/1970 | Van der Schee | 264/349 |
| 3,976,419 | 8/1976 | Egli et al. | 425/467 |
| 4,623,502 | 11/1986 | Cohen . | |
| 4,636,084 | 1/1987 | Kopernicky | 264/101 |
| 4,900,494 | 2/1990 | Wobbe | 264/102 |
| 5,102,594 | 4/1992 | Burlet et al. | 264/101 |

OTHER PUBLICATIONS

Adrian, D. W., *The Quasiperiodic Nature of Wall Slip for Molten Plastics in Large Amplitude Oscillatory Shear*, MS Thesis, Texas A&M University (1992).

Adrian, D.W., and Giacomin, A.J., *The Quasiperiodic Nature of a Polyurethane Melt in Oscillatory Shear*, J. Rheol. 36 1227 (1992).

Dussan V., Elizabeth B. and Davis, Stephen H., *On the motion of a Fluid–fluid interface along a solid surface*, J. Fluid Mech., vol 65 part 1, 71–95 (1974).

Dussan V., E.B. and Davis, S.H., *Stability in systems with moving contact lines*, J. Fluid Mech., vol. 173, 115–130 (1986).

Giacomin, A.J., Samurkas, T. and Dealy, J.M., *A Novel Sliding Plate Rheometer for Molten Plastics*, Polymer Engineering & Science, vol 29, 499–504 (1989).

Hatzikiriakos, S.G. and Dealy, J.M., *Wall slip of Molten high density polyethylene. I. Sliding plate rheometer studies*, J. Rheol. vol 35, 497–523 (1991).

Hocking, L.M., *A moving fluid interface on a rough surface*, J. Fluid Mech., vol 76, 801–817 (1976).

Huh, Chun and Scriven, L.E., *Hydrodynamic Model of Steady Movement of a Solid/Liquid/Fluid Contact Line*, Journal of Colloid and Interface Sci., vol. 35, 85–101 (1971).

Huh, C. and Mason, S.G., *The steady movement of a liquid meniscus in a capillary tube*, J. Fluid Mech. vol 81, part 3, 401–419, (1977).

Jeyaseelan, Ranjit S., Giacomin, A.J. and Oakley, Jason G., *Simplification of Network Theory for Polymer Melts in Nonlinear Oscillatory Shear*, AIChE Journal, vol 39, No. 5, 846–854 (1993).

(List continued on next page.)

Primary Examiner—Mathieu D. Vargot
Attorney, Agent, or Firm—Vaden, Eickenroht & Thompson, L.L.P.

[57] ABSTRACT

The present invention relates to a process for minimizing the flow instability of molten plastics caused by slippage of the melt at the die wall during the extrusion process. The slippage, and therefore the flow instability, is minimized by removing the air from, or "degassing", the polymer prior to the extrusion process, preferably by subjecting the molten polymer to a vacuum for an extended time, typically 24 hours. Further, air is preferably prevented from being introduced into the molten polymer, the extrusion die or the extrusion process from the ambient conditions surrounding the extrusion process during the extrusion process by creating a vacuum over the polymer hopper, the feed region of the extrusion system, the exit portion of the die, the entire extrusion system or any combination thereof.

20 Claims, 2 Drawing Sheets

OTHER PUBLICATIONS

Li, A.C. and Slattery, J.C. *Non–Uniform particle Distributions During Tube Flows of Neutrally Buoyant Suspensions in Second–Order Fluids.* Chem. Eng. Comm., vol 101, 17–38 (1991).

Whitaker, Stephen and Pigford, R.L., *Numerical Differentiation of Experimental Data,* Ind. Eng. Chem. vol 52, 185–187 (1960).

Young, G.W. and Davis, S.H., *A plate oscillating across a liquid interface: effects of contact–angle hysteresis,* J. Fluid Mech., vol 174, 327–356 (1987).

METHOD OF EXTRUDING PLASTICS

BACKGROUND OF THE INVENTION

The present invention relates to a method of extruding plastics while reducing slippage of the melt at the die wall during the extrusion process so as to avoid sharkskin melt fracture.

Plastics are extruded to produce a variety of products including bottles, fishing line, fiber for clothing, clear plastic wrap, and pipe. Melt fracture is a very important phenomenon in the extrusion of these polymers. Melt fracture places an important limitation on the maximum throughput of an extrusion line. When the rate of extrusion is too high, sharkskin melt fracture develops and creates adverse effects on the product. For example, plastic wrap and bottles will not be transparent and fibers and pipes form unwanted "ribs".

Melt fracture has been attributed to a flow instability due to the slippage of the melt at the die wall. The onset of slip at the wall could be a function of various factors, including surface roughness of the wall and the physio-chemical interactions of the liquid-solid interface between the melt and the wall.

Suppression of melt fracture allows a dramatic increase in the throughput of an extrusion line. The use of additives has increased throughput by a reported factor of three to four. This increase allows a manufacturer to produce the same amount of product using only 25 to 33 percent of the number of extrusion lines needed for production without additives. However, additives do not suppress melt fracture effectively, working only on a hit and miss basis.

Further, it is estimated that the plastics industry spends at least 2 percent of the cost of the resins used in extrusion of plastics on processing additives to suppress the sharkskin melt fracture. Reports from the plastics industry show that in 1993 producers in the United States, Canada and Mexico demanded and used Low Density Polyethylene (LDPE), Linear Low Density Polyethylene (LLDPE), Ethylene Vinyl Acetate (EVA), High Density Polyethylene (HDPE), Polypropylene (PP), Polyvinyl Chloride (PVC), and Polystyrene (PS) at an average price of $0.40/lb. as follows:

| RESIN | DEMAND (Million lbs) | TOTAL EXTRUDED (Million lbs) | EXTRUDED RESIN COST (Million $) |
|---|---|---|---|
| LDPE/LLDPE/EVA | 13,708 | 10,584 | 4,233.60 |
| HDPE | 10,544 | 2,886 | 1,154.40 |
| PP | 9,147 | 4,040 | 1,616.00 |
| PVC | 10,605 | 6,692 | 2,676.80 |
| PS | 5,735 | 2,581 | 1,032.40 |
| Total | 49,739 | 26,783 | 10,713.20 |

Based upon these reported figures, the total cost of the additives used by the plastics industry in 1993 to suppress sharkskin melt fracture is about $200 million.

SUMMARY OF THE INVENTION

The present invention relates to a process for minimizing the flow instability of molten plastics caused by slippage of the melt at the die wall during the extrusion process. The slippage, and therefore the flow instability, is minimized by reducing the concentration of air in, and preferably removing, the air from, i.e. "degassing", the polymer prior to the extrusion process.

This "degassing" is not to be confused with the removal of toxic gases from polymers that remain from the polymer production process. That "degassing" is done in situations where the extrusion will result in the production of primary materials such as bulk polymer pellets. At an early stage in the processing of polymers, this removal of toxic gases, or "degassing", often occurs, but does not address or solve the problem of air diffusion during the final extrusion processes. Rather, such processes are designed to remove toxic gases and not air. Further, even if such degassing were to remove all of the air, the polymers are typically then exposed to the air so that they would reabsorb and retain air prior to the final extrusion process. The present invention relates not to extrusions at or about the time when toxic gases are removed, but to extrusions of polymers at a later stage, where the product is one used by the general consumer, i.e. plastic wrap, bottles, pipe and the like.

Further, in the present invention, air is preferably prevented from being introduced into the polymer, the extrusion die or the extrusion process from the ambient conditions surrounding the extrusion process during the extrusion process by creating a vacuum over the hopper containing the polymer resin, the feed region of the extrusion system, the exit region of the die, the space surrounding the extrusion equipment or any combination thereof. These steps serve to minimize the potential for air to be introduced into the extrusion system.

DESCRIPTION OF THE DRAWINGS

In oscillatory shear, where $\gamma(t)$ is the shear strain, F is the frequency, t is the time, and $\sigma(t)$ is the shear stress.

DETAILED DESCRIPTION

Figure 3:
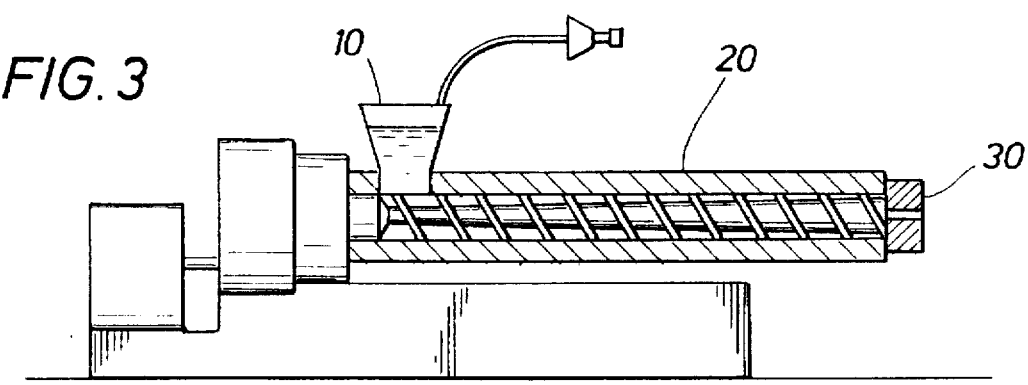
FIG. 3 is a schematic depiction of a typical prior art extrusion system with the vacuum pump added by one embodiment of the invention.

With reference to FIG. 3, one of the necessary conditions for the melt to slip at the wall is the formation of a third phase at the interface between the polymer and the die wall. One such third phase may be air which diffuses out of the solution in the polymer at the wall. Therefore, the amount of air in the polymer influences the amount of slip at the wall. The amount of air in the polymer may be reduced or eliminated by subjecting the polymer to sufficiently high temperatures to maintain the polymer in a molten state while simultaneously decreasing the surrounding pressure on the polymer by drawing a vacuum. This may be done in a standard vacuum oven. Under the vacuum, the air in the molten polymer diffuses out of the polymer and is removed by the vacuum, leaving degassed polymer. The polymer may also be degassed by placing it under a vacuum without heating or melting it. However, heating and melting the polymer increase the rate at which the air diffuses from the polymer.

While degassing the polymer provides a substantial reduction in sharkskin melt fracture, in some instances air entering the process from outside the die may be so abundant that the air diffusing from the molten polymer, whether degassed or not, becomes negligible. The outside air then may cause sharkskin fracture in spite of the degassing of the polymer. Therefore, as shown in FIG. 3, the hopper 10 in a standard extrusion system is preferably sealed and a vacuum pump is added to provide a continuous vacuum over hopper 10. In some extrusion systems, there maybe a gap between the hopper 10 and the feed region 20 of the extrusion system. In that event, a vacuum is preferably provided over the feed region 20 of the extrusion system to prevent outside air from entering the system prior to and during extrusion. A vacuum may also be provided over the exit region of die 30 to retard the entry of air into the die from the exit region. Alternatively, a vacuum may be provided over the hopper 10, the feed region 20, the exit region of die 30, or any combination of the hopper 10, feed region 20 and exit region of die 30, or over the entire extrusion system. Additionally, it is possible, and may be preferable, to degas the polymer after it has been introduced into the hopper 10 but prior to extruding.

Base Case

For purposes of a base case, large amplitude oscillatory shear (LAOS) experiments were performed on a polymer melt that was degassed and compared to the slip characteristics in LAOS flow of an untreated polymer to verify the effect of the amount of dissolved air on the onset of wall slip. A molten linear low density polyethylene, Dowlex 2037 manufactured by Dow Chemical, was used in the study. The experiments were conducted at 190° C. on a MTS direct shear rheometer. This is a commercial version of a sliding plate rheometer incorporating a shear stress transducer developed at McGill University. The samples were compression molded to 50 mm×125 mm×1.25 mm. The gap thickness between the stationary and the sliding plates of the rheometer was 1

The molded sample was degassed at 115° C. for at least 24 hours in a vacuum oven. The experiment was conducted almost immediately after the sample was taken out of the vacuum oven to prevent the reentry of air at the surface of the sample. The resulting data collected from these experiments are reflected in FIGS. 1a, 1b and 1c for the untreated sample and in FIG. 2 for the treated sample.

It was found that degassing did not affect the steady-state (no-slip) non-linear viscoelastic properties of the melt at all conditions of strain amplitude and frequency. For a strain amplitude of 10 and frequency of 2.5 Hz, the transition time (or number of cycles) to slip was not significantly different for degassed and untreated samples. However, at the less severe conditions of strain amplitude 8 and frequency of 1.0 Hz, it was seen that the transition time was significantly larger (about twice) for the degassed melt as compared to the untreated melt.

Figure 1A:
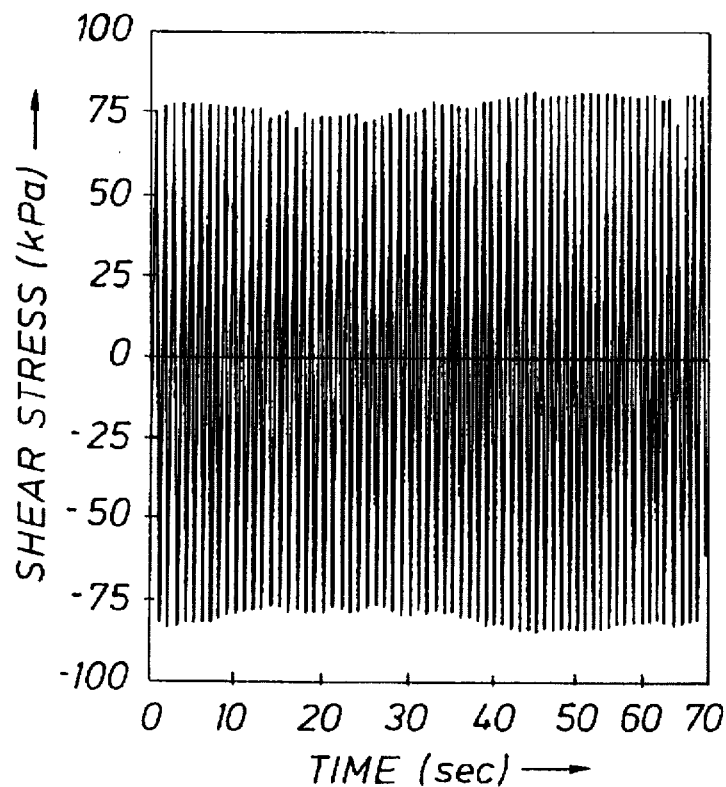
FIG. 1a is a graph of the shear stress response of untreated Dowlex 2037 in large amplitude oscillatory shear (LAOS) with $\gamma_o=8$, F=1 Hz, at 190° C., for cycles 1 to 66.
Figure 1B:
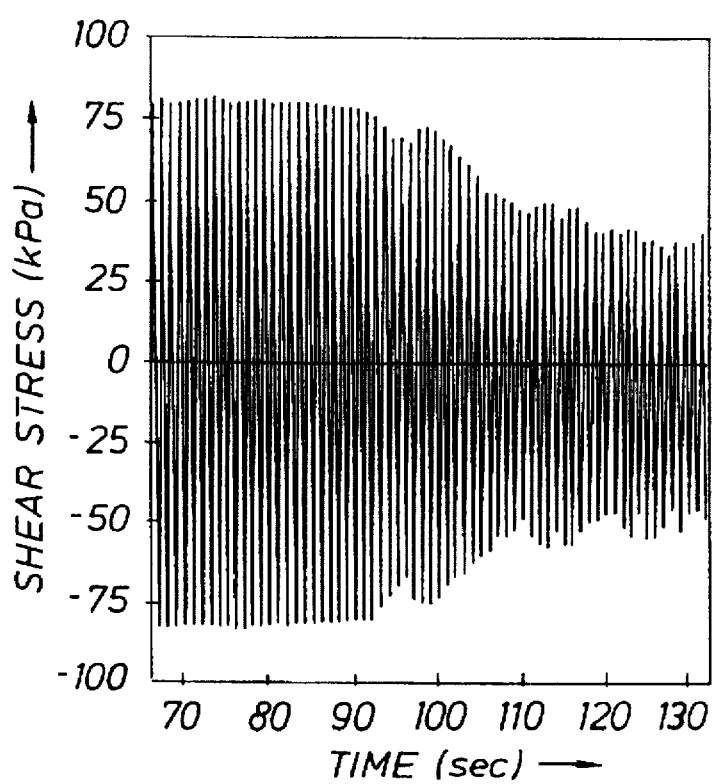
FIG. 1b is a graph of the shear stress response of untreated Dowlex 2037 in LAOS with $\gamma_o=8$, F=1 Hz, at 190° C., for cycles 67 to 134.
Figure 1C:
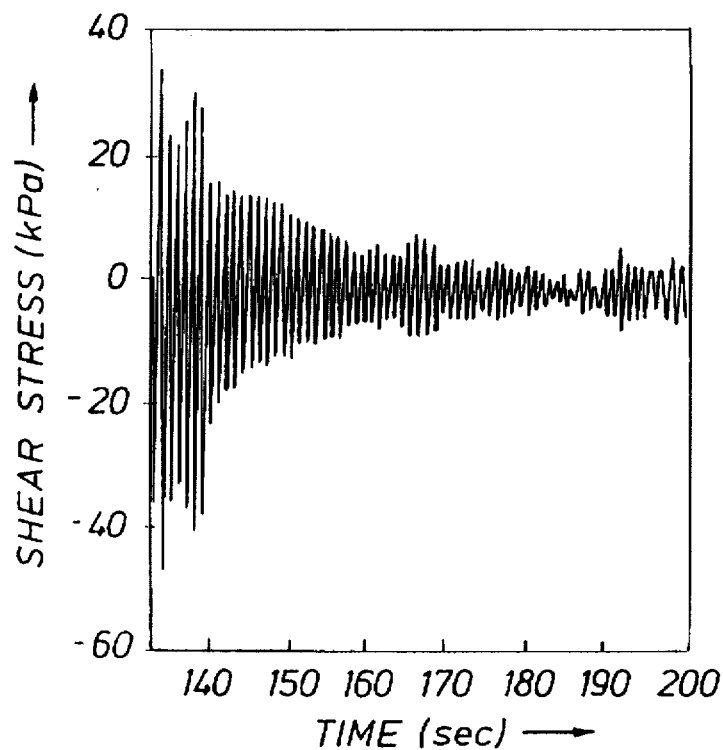
FIG. 1c is a graph of the shear stress response of untreated Dowlex 2037 in LAOS with $\gamma_o=8$, F=1 Hz, at 190° C., for cycles 135 to 200.

FIGS. 1a, 1b, and 1c show the shear stress as a function of time during the LAOS experiment, at a strain amplitude of 8 and a frequency of 1 Hz, for the molten untreated LLDPE at 190° C. Initially, the shear stress response is periodic within experimental error. At t=93 sec., there is a significant reduction in the amplitude of the shear stress wave and the response is no longer periodic. This is attributed to slip at the wall caused by the beginning of the formation of a third phase (air) thin film between the polymer and the die wall. The shear stress spikes shown in FIG. 1c are attributed to a stickslip condition at the wall, caused by either an incomplete gas film or a partial collapse of the film.

Figure 2:
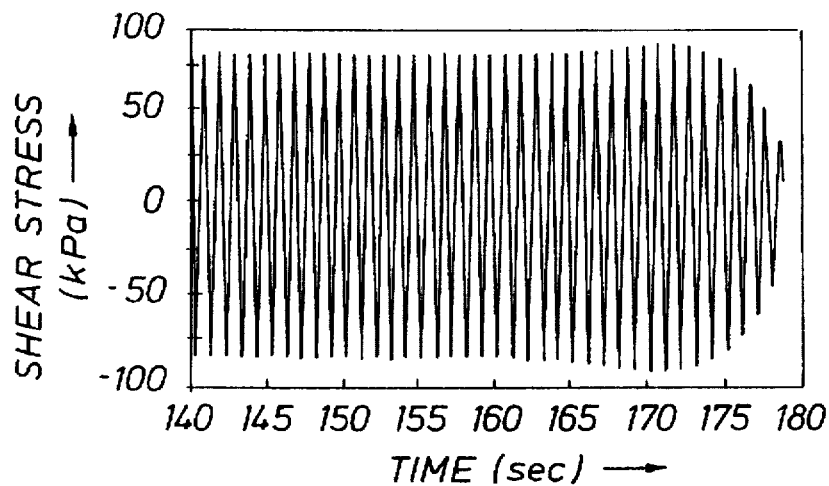
FIG. 2 is a graph of the shear stress response of degassed Dowlex 2037 in LAOS with $\gamma_o=8$, F=1 Hz, at 190° C., for cycles 140 to 180.

FIG. 2 shows the shear stress as a function of time during the LAOS experiment, at a strain amplitude of 8 and a frequency of 1 Hz, for the molten degassed LLDPE at 190° C. No significant reduction in the amplitude of the shear stress wave occurred for this sample until t=174 sec. This time required for transition is significantly larger than that observed with the untreated sample.

The delay in transition time shows that maintaining LLDPE at 190° C. under vacuum for 24 hours prior to extruding the LLDPE substantially depresses the slippage of the melt at the die wall during the extrusion process so as to avoid sharkskin melt fracture. The slippage of the melt would be further depressed if the extrusion were performed under at least partial vacuum to avoid the introduction of air into the polymer or the process.

Although a preferred embodiment of the invention has been described, it will be appreciated by those skilled in the art to which the present invention pertains that modifications, changes, and improvements, may be made without departing from the spirit of the invention defined by the claims. For example, without limitation as to other modification, changes, and improvements it may be desirable to increase the temperature, increase the vacuum, or vary the pre-extrusion processing time when the polymer is being degassed. Further, the degassed polymer may be used with or without modifying the extrusion equipment to prevent outside air into the process. Further, the polymer could be degassed by the polymer producer and transported in containers designed to maintain the polymer in a degassed state rather than the plastics manufacturer degassing the polymer prior to use.

What is claimed:

1. A method of reducing slippage of the melt at the die wall during the extrusion of polymers comprising:
   (a) heating the polymer in a vacuum oven until the polymer reaches a molten state; and
   (b) evacuating the space in the oven over the polymer.
2. The method of claim 1, wherein:
   the gas that diffuses from the polymer after said evacuation of the space over the polymer is also evacuated.
3. The method of claim 1, wherein:
   said evacuation of the space over the polymer is continued while gas diffuses from the polymer.
4. The method of claim 1, wherein:
   said polymer is maintained at a temperature of at least 190° C.
5. The method of claim 1, wherein:
   said polymer is maintained under vacuum for at least 24 hours prior to extrusion.
6. A method of reducing slippage of the melt at the die wall during the extrusion of polymers using extrusion equipment including at least a hopper, a feed region, and a die including an entrance and an exit region comprising:
   (a) sealing the hopper containing the molten polymer resin; and
   (b) evacuating the space external to and surrounding at least a portion of the extrusion equipment.
7. The method of claim 6, wherein:
   said space surrounds the feed region of the extrusion system.
8. The method of claim 6, wherein:
   said space surrounds the exit region of the die.

9. A method of reducing slippage of the melt at the die wall during the extrusion of polymers using extrusion equipment including at least a hopper, a feed region, and a die including an entrance and an exit region comprising:

(a) sealing the hopper containing the molten polymer resin; and (b) evacuating the vapor from the hopper after said sealing.

10. A method of reducing slippage of the melt at the die wall during the extrusion of polymers using extrusion equipment including at least a hopper, a feed region, and a die including an entrance and an exit region comprising:

(a) sealing the space around the exit region of the die; and (b) evacuating said space around the exit region of said die.

11. A method of reducing slippage of the melt at the die wall during the extrusion of polymers using extrusion equipment including at least a hopper, a feed region, and a die including an entrance and an exit region comprising:

(a) heating the polymer to obtain and maintain said polymer in a molten state;

(b) evacuating the space over the molten polymer;

(c) sealing the hopper containing the polymer; and (d) evacuating the space surrounding the extrusion equipment.

12. A method of extruding polymers using extrusion equipment including at least a hopper, a feed region, and a die including an entrance and an exit region comprising:

(a) heating the polymer to obtain and maintain a said polymer in a molten state;

(b) evacuating the space over the molten polymer;

(c) extruding said molten polymer.

13. A method of extruding polymers using extrusion equipment including at least a hopper, a feed region, and a die including an entrance and an exit region comprising:

(a) heating the polymer to obtain and maintain a said polymer in a molten state;

(b) evacuating the space over the molten polymer;

(c) transferring the molten polymer to the hopper in an extrusion device;

(d) sealing the hopper containing the polymer;

(e) evacuating the air from the hopper after the hopper is sealed; and (f) extruding the polymer.

14. The method of claim 13, further comprising:

drawing a vacuum over the feed region of the extrusion system.

15. The method of claim 13, further comprising:

drawing a vacuum over the exit region of the die.

16. The method of claim 13, further comprising:

drawing a vacuum over the extrusion system.

17. A method of reducing slippage of the melt at the die wall during the extrusion of polymers using extrusion equipment including at least a hopper, a feed region, and a die including an entrance and an exit region comprising:

(a) reducing the concentration of air in the molten polymer; and (b) minimizing the potential for air to be introduced into the extrusion system.

18. The method of claim 17, wherein:

the potential for air to be introduced into the extrusion system is reduced by drawing a vacuum over the feed region of the extrusion system.

19. The method of claim 17, wherein:

the potential for air to be introduced into the extrusion system is reduced by drawing a vacuum over the exit region of the die.

20. The method of claim 17, wherein: the potential for air to be introduced into the extrusion system is reduced by drawing a vacuum over the extrusion system.

* * * * *

UNITED STATES PATENT AND TRADEMARK OFFICE
CERTIFICATE OF CORRECTION

PATENT NO.   : 5,637,268
DATED        : June 10, 1997
INVENTOR(S)  : John C. Slattery, A. J. Giacomin It is certified that error appears in the above-indentified patent and that said Letters Patent is hereby corrected as shown below:

```
Col. 3, line 10, change "maybe" to --may be--.
Col. 3, line 39, after "1" insert --mm.--.
Col. 5, line 30, cancel "a" before "said".
Col. 5, line 38, cancel "a" before "said".
```

Signed and Sealed this

Sixteenth Day of September, 1997

Attest:

BRUCE LEHMAN

*Attesting Officer*     Commissioner of Patents and Trademarks